(12) United States Patent
Shintani et al.

(10) Patent No.: US 7,757,578 B2
(45) Date of Patent: *Jul. 20, 2010

(54) GEAR CHANGE CONTROL SYSTEM OF AUTOMATIC TRANSMISSION

(75) Inventors: Masanori Shintani, Okazaki (JP); Masashi Fujimoto, Toyoake (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/285,081

(22) Filed: Sep. 29, 2008

(65) Prior Publication Data

US 2009/0211389 A1    Aug. 27, 2009

(30) Foreign Application Priority Data

Feb. 22, 2008   (JP)   ............... P.2008-041619

(51) Int. Cl.
*F16H 59/00* (2006.01)
*F16H 61/00* (2006.01)
*F16H 63/00* (2006.01)
*F16H 59/04* (2006.01)

(52) U.S. Cl. .................... 74/337.5; 74/473.36
(58) Field of Classification Search ............ 74/337.5, 74/473.36
See application file for complete search history.

(56) References Cited

U.S. PATENT DOCUMENTS

| 6,634,247 | B2 | 10/2003 | Pels et al. |
| 2005/0247146 | A1 | 11/2005 | Kluge |
| 2009/0038423 | A1 * | 2/2009 | Shintani .................. 74/335 |

FOREIGN PATENT DOCUMENTS

| DE | 10316163 A1 | 11/2004 |
| EP | 0 310 387 A2 | 4/1989 |
| EP | 0 418 107 A1 | 3/1991 |
| EP | 1 308 651 A1 | 5/2003 |
| EP | 1308651 A1 * | 5/2003 |

(Continued)

OTHER PUBLICATIONS

Translation of EP 1510733 (IDS reference).*

(Continued)

*Primary Examiner*—Tisha D Lewis
(74) *Attorney, Agent, or Firm*—Birch, Stewart, Kolasch & Birch, LLP

(57) ABSTRACT

A gear change control system of an automatic transmission, includes: a shift member, including a shaft portion having a selection axis oriented in a selecting direction, and a pair of arm portions formed on the shaft portion and projecting therefrom; shift rail members, having rail shaft portions, and having a shift axis oriented in a shifting direction; shift fork portions, formed on the rail shaft portions; shift lug members, formed on the rail shaft portions and including pillar-shaped portions. The arm portions swing about the selection axis to apply a pressure in the shifting direction from one side of the pillar-shaped portion by one of the arm portions to cause the shift fork portion to make a shifting operation, and to apply a pressure in the shifting direction from the other side of the pillar-shaped portion by the other arm portion to make a shift withdrawing operation.

5 Claims, 9 Drawing Sheets

FOREIGN PATENT DOCUMENTS

| | | |
|---|---|---|
| EP | 1510733 | 3/2005 |
| EP | 1 607 661 A2 | 12/2005 |
| JP | 6-331028 A | 11/1994 |
| JP | 2001-304411 A | 10/2001 |
| JP | 2004-316834 A | 11/2004 |
| JP | 2005-532517 | 10/2005 |

OTHER PUBLICATIONS

German Office Action issued Dec. 14, 2009, in German Application No. 10 2008 048 889.5-14.

* cited by examiner

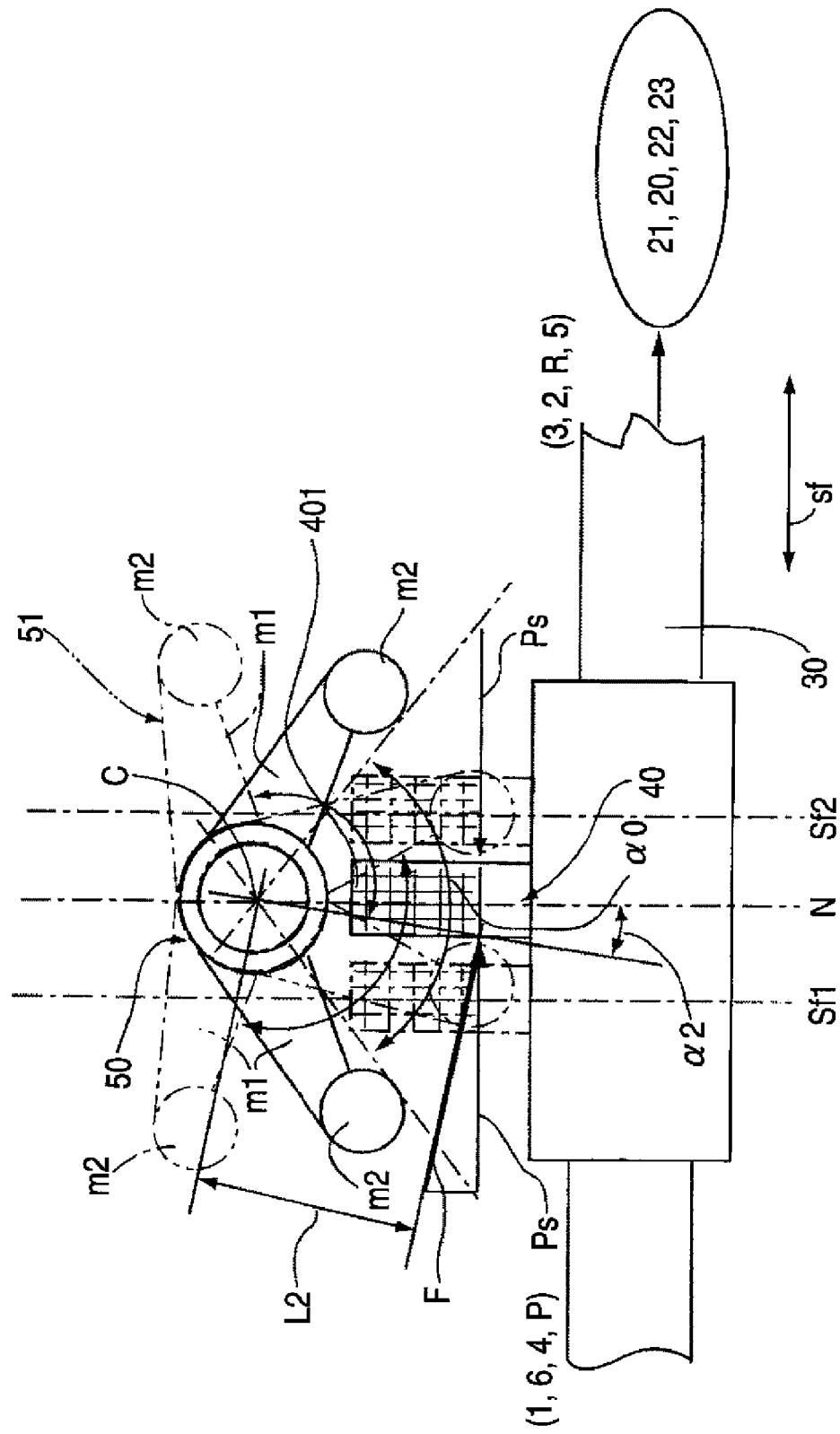

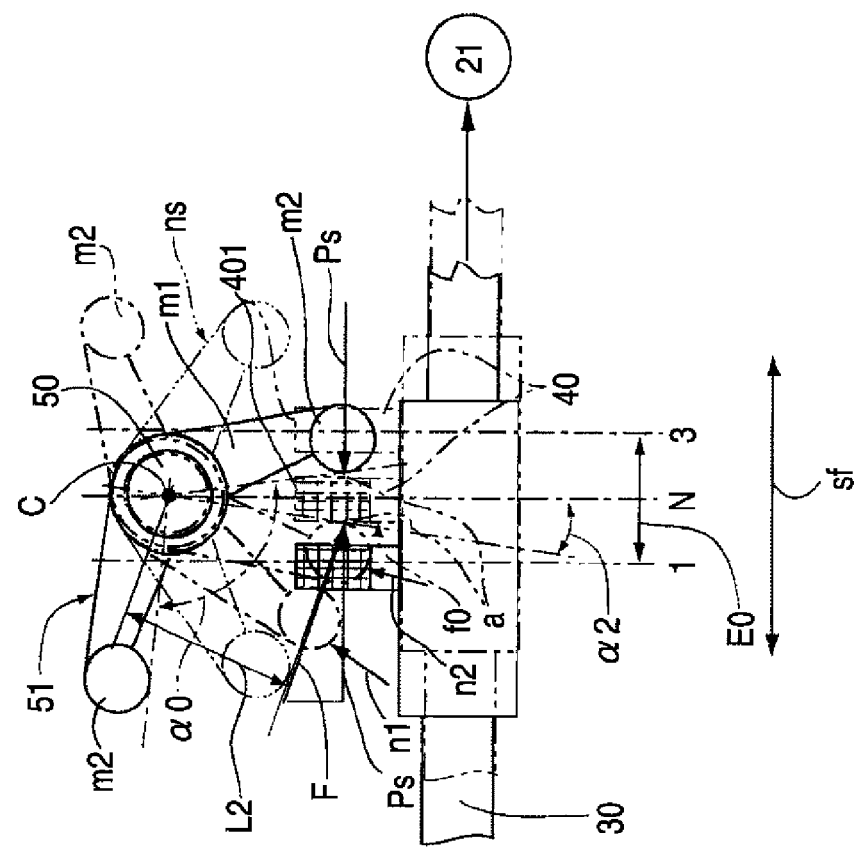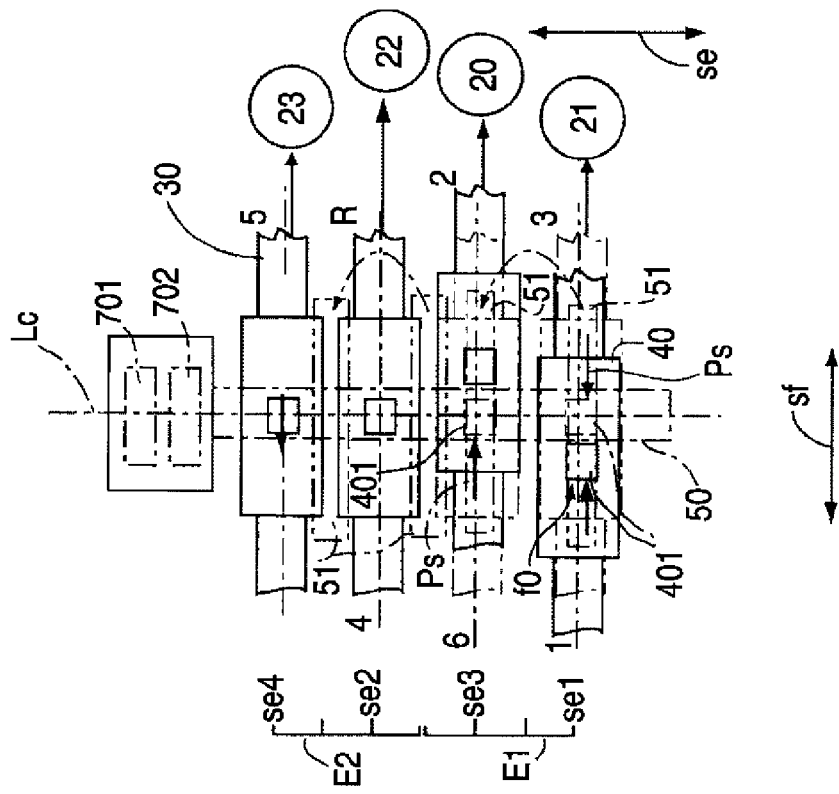

GEAR CHANGE CONTROL SYSTEM OF AUTOMATIC TRANSMISSION

BACKGROUND OF THE INVENTION

1. Field of the Invention

The present invention relates to a gear change control system of an automatic transmission which is provided on a drive train of a vehicle.

2. Description of the Related Art

There is a mechanical automatic transmission which does not use a torque converter as a transmission provided on a drive train of a vehicle.

This mechanical automatic transmission obviates the necessity of a torque converter by implementing actuation of a gear change control (selection and implementation of a gear shift) and engagement and disengagement of a clutch which are to be performed in a manual transmission by an actuator. For example, as is shown in FIGS. 8A and 8B, a gear change control system of an automatic transmission includes a shift shaft 100 which can move in a shifting direction sf and a selecting direction se, shift lugs 120 which are formed, respectively, at one parts on a plurality of shift rails 110 which are arranged in the selecting direction se, in such a manner as to project radially outwards therefrom and shift forks 131, 132, 133 which are connected integrally to another parts of the shift rails 110, respectively.

Furthermore, a control finger (an arm portion) 140 is provided on the shift shaft 100 in such a manner as to project radially therefrom, and a pair of claw portions 121 are formed on each shift lug 120 in such a manner as to be spaced apart from each other in the shifting direction sf.

In the mechanical automatic transmission configured as has been described above, by moving the shift shaft 100 by an actuator (not shown), the pair of claw portions 121 of one of the shift rails 110 are selectively moved in one or the other of the shifting directions sf by the control finger 140, so that the shift fork 131 which is linked with the shift rail 110 is made to shift a gear which faces oppositely the shift fork 131.

Incidentally, a dual-clutch automatic transmission has been developed in which two clutches are incorporated between an automatic transmission like the one described above and an engine which is a power source. This automatic transmission includes first and second main shafts, and one and the other of the main shafts change the speed of a rotational force transmitted thereto from the associated clutches for transmission to countershafts they face oppositely, the speed-changed rotation being then transmitted from each of the countershafts to an output gear side of the transmission. In the dual-clutch automatic transmission configured described above, in making a gear shift, a state in which one gear is engaged with one of the clutches via the first main shaft is switched to a state in which a target gear is engaged with the other clutch via the second main shaft, and as this occurs, a neutral state can be eliminated during the gear change by releasing gradually the engagement of the one of the clutches while engaging gradually the other clutch on the target gear side, thereby making it possible to realize a smooth gear change without any interruption of power flow during the gear change.

In a gear change control system adopted in the transmission described above, for example, as is shown in FIG. 9A, it assumes that a gear change has been made from a fourth gear which is a gear currently engaged to a target gear, for example, a first gear while maintaining the state in which the current gear is engaged. Immediately thereafter, as is shown in FIG. 9B, while the synchronization in rotational speed of the target gear with the engine speed is in progress, a gear shift withdrawal from the previous gear (here, the fourth gear) is implemented. To describe this by reference to a locus indicated by a chain double-dashed line in the figure, in the gear shift withdrawal from the previous gear position, the following steps need to be implemented quickly: firstly, a step (1) in which the control finger is offset from the target gear (the first gear) position in the selecting direction, a shift step (2) in which the control finger returns to a neutral line N, a selecting step (3) in which the control finger moves towards the gear (the fourth gear), a shift step (4) in which the control finger moves towards the gear (the fourth gear), a selecting step (5) in which the control finger reaches the gear (the fourth gear) position, and a gear shift withdrawal step (6) in which the control finger withdraws the gear shift made to the gear (the fourth gear) to a neutral position (indicated by the chain double-dashed line) thereof.

In addition, JP-A-2001-304411 proposes an automatic transmission in which a pair of claw portions are provided on each shift lug in such a manner as to be spaced apart widely from each other in a shifting direction, so that a control finger can enter between the pair of claw portions on the shift lug of a target gear which is in a neutral state only by being moved in a selecting direction from between the pair of claw portions of the shift lug which is in the shifted state, so as to simplify the movement of a shift member.

In this way, in the dual-clutch automatic transmission, since the gear shift to the target gear and the gear shift withdrawal from the currently engaged gear need to be performed in that order during gear change, the movement of the control finger 140 gets complex, resulting in a cause for extending the gear change time, and an improvement in this area has been longed for.

Furthermore, in the related art disclosed in JP-A-2001-304411, in order for the arm portion (the control finger) of the shift member to enter between the pair of claw portions when the arm portion is moved directly in the selecting direction, the pairs of claw portions each have to be disposed in such a manner as to be spaced apart relatively widely from each other. In this case, as is shown in FIG. 7, in the event that an interval L1 between the pair of claw portions 121 is increased, the arm portion 140 of the shift member pushes on the claw portion 121 in such a state that the arm portion 140 is largely inclined in the shifting direction. As this occurs, it assumes that a force acting on the claw portion 121 by a rotational torque T of the control shaft 100 is a tangential force F, a distance from a contact point a between the arm portion 140 of the shift member and the claw portion 121 to an axial center C of the control shaft 100 is a distance L2, and an inclination angle of a line connecting the contact point a with the axial center C towards the shifting direction is an angle α, a component force of the tangential force F in the shifting direction, that is, a component force P1 which constitutes a force for moving the claw portion 121 in the shifting direction is obtained by the following expression (1).

$$P1 = F \times \cos\alpha = (T/L2) \times \cos\alpha \tag{1}$$

In the expression (1) above, it is found that with the distance L2 being substantially constant irrespective of the angle α, the component force P1 decreases as the angle α increases within a range of 0 to 90 degrees. In addition, it is found that the distance L2 increases and the component force P1 decreases further as the angle α increases within a range of 0 to 90 degrees. Consequently, in the event that the interval L1 between the pair of claw portions 121 is increased as with JP-A-2001-304411, the force P1 which pushes on the claw portion 121 in the shifting direction decreases, and it becomes difficult to move the shift lug which is linked with the claw portion 121 in the shifting direction with good efficiency.

SUMMARY

It is therefore an object of the invention to provide a change-speed shift control system of an automatic transmission which can simplify a shifting process of an arm portion which is made integral with a shift member during gear change so as to increase the change-speed controllability and moreover which can hold relatively large a pressure exerted in a shifting direction by the arm portion so as to shorten a change speed controlling time.

In order to achieve the object, according to the invention, there is provided a gear change control system of an automatic transmission, comprising:

a shift member, including a shaft portion which is disposed in such a manner that a selection axis thereof is oriented in a selecting direction, and including an arm portion which is formed on the shaft portion in such a manner as to project therefrom;

a plurality of shift rail members, having rail shaft portions, and arranged in such a manner that shift axes of the rail shaft portions are oriented in a shifting direction;

shift fork portions, formed on the rail shaft portions in such a manner to project therefrom, and operable to make gear shifts of gears within a change-speed gear section;

shift lug members, formed on the rail shaft portions in such a manner to project therefrom, and being capable of facing the arm portion, wherein the arm portion of the shift member moves for selection and gear shifting and presses against the selected shift lug member, so that a gear shift to a target gear is attained by the shift fork portion which is linked with the shift lug member so pressed against via the rail shaft portion, the shift lug members include pillar-shaped portions, the arm portion includes a pair of arm portions projecting from the shaft portion in such a manner as to oppositely face each other, and the pair of the arm portions move for selection in a direction of the selection axis to select the shift lug member and then swing about the selection axis to apply a pressure in the shifting direction from one side of the pillar-shaped portion of the selected shift lug member by one of the pair of the arm portions so as to cause the shift fork portion of the shift rail member which is linked with the shift lug member to perform a shift making operation, and to apply a pressure in the shifting direction from the other side of the pillar-shaped portion by the other arm portion so as to cause the shift fork portion of the shift rail member which is linked with the shift lug member to perform a shift withdrawing operation.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

FIG. 4 is an enlarged side view of a pillar-shaped projecting portion which oppositely faces a pair of arm portions within the gear change control system.

FIGS. 5A and 5B are explanatory diagrams of operations of the arm portions and the projecting portion which occur when the gear change control system in FIG. 1 makes a gear shift from a first gear to a second gear. FIG. 5A shows a plan view, and FIG. 5B is a side view.

FIG. 6A shows a plan view, and FIG. 6B is a side view.

FIG. 8A is a plan view, and FIG. 8B is a side view.

FIG. 9A is a plan view, and FIG. 9B is a side view.

DETAILED DESCRIPTION OF THE INVENTION

Hereinafter, a gear change control system of an automatic transmission as an embodiment of the invention will be described by reference to FIGS. 1 and 2.

Figure 1:
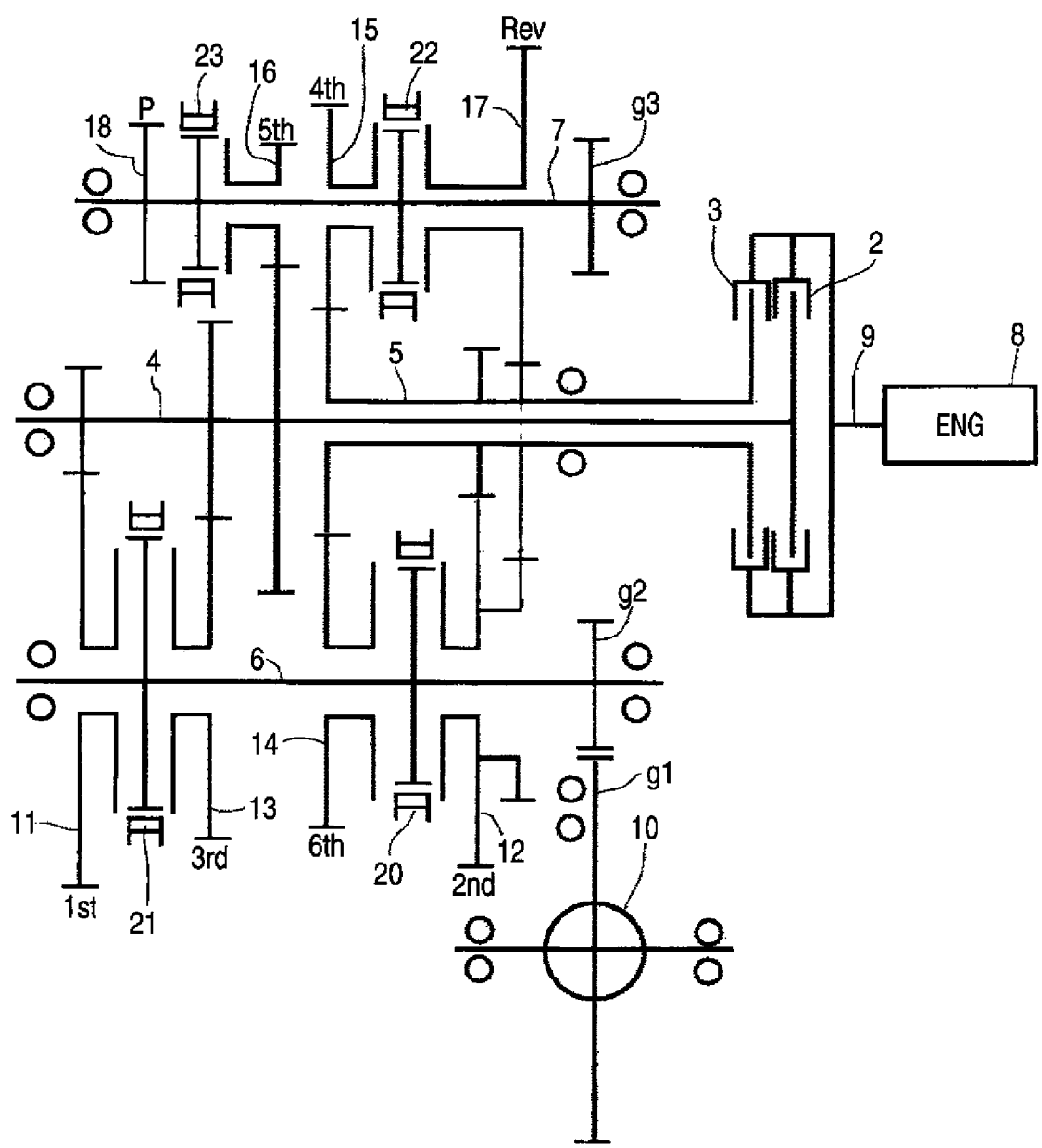
FIG. 1 is a schematic block diagram of a drive train of a vehicle provided with a gear change control system of an automatic transmission as one embodiment of the invention.

As is shown in FIG. 1, an automatic transmission 1 is a dual-clutch automatic transmission and includes two clutches 2, 3, two main shafts 4, 5 which are provided concentrically with each other, and two countershafts 6, 7. Power is transmitted to the first main shaft 4 via the first clutch 2 from a driving force transmission shaft 9 which transmits a driving force from an engine 8, while power is transmitted to the second main shaft 5 via the second clutch 3 from the driving force transmission shaft 9. Note that the two clutches are controlled to be engaged and disengaged by a control circuit (for example, a hydraulic, electric or mechanical control circuit), not shown.

The first countershaft 6 and the second countershaft 7 are disposed in such a manner as to be spaced apart from each other so that their axes become parallel to the first main shaft 4 and the second main shaft 5. In addition, an output gear g2 of the countershaft 6 and an output gear g3 of the countershaft 7 are both made to transmit power to a reduction gear g1 of a differential 10 disposed at a rear stage of the automatic transmission 1.

A first driven gear 11, a second driven gear 12, a third driven gear 13 and a sixth driven gear 14 are supported rotatably on the first counter shaft 6. A fourth driven gear 15, a fifth driven gear 16 and a reverse driven gear 17 are supported rotatably on the countershaft 7. In addition, a parking gear 18 is fixed to the countershaft 7.

Furthermore, the first driven gear 11, the third driven gear 13 and the fifth driven gear 16 which are gears of a first group are coupled to the first main shaft 4 in such a manner that the rotation of the first main shaft 4 can be transmitted to the gears coupled thereto. The second driven gear 12, the fourth driven gear 15, the sixth driven gear 14 and the reverse gear 17 which are gears of a second group are coupled to the second main shaft 5 in such a manner that the rotation of the second main shaft can be transmitted to the gears coupled thereto.

In addition, as is shown in FIG. 1, a transmission section 101 includes four shift forks 20 to 23. The first shift fork 20 and the second shift fork 21 are installed in such a manner as to slide along the axis of the first countershaft 6, while the third shift fork 22 and the fourth shift fork 23 are installed in such a manner as to slide along the axis of the second countershaft 7.

By moving the shift forks 20 to 23 to slide in the way described above, the second driven gear 12 and the sixth driven gear 14 can selectively be connected to or disconnected from (shifted to or from) the countershaft 6 by the first shift fork 20, while the first driven gear 11 and the third driven gear 13 can selectively be connected to or disconnected from (shifted to or from) the countershaft 6 by the second shift fork 21. In addition, the fourth driven gear 15 and the reverse gear 17 can selectively be connected to or disconnected from (shifted to or from) the countershaft 7 by the third shift fork 22, while the fifth driven gear 16 can selectively be connected to or disconnected from (shifted to or from) the countershaft 7 by the fourth shift fork 23.

In this way, in the transmission section 101 of the dual-clutch automatic transmission, a selective switching to any gear of a first group which is made up of a first gear, a third gear and a fifth gear is made to be implemented via the first clutch 2, while a selective switching to any gear of a second group which is made up of a second gear, a fourth gear, a sixth gear and a reverse gear is made to be implemented via the second clutch 3.

Figure 2:
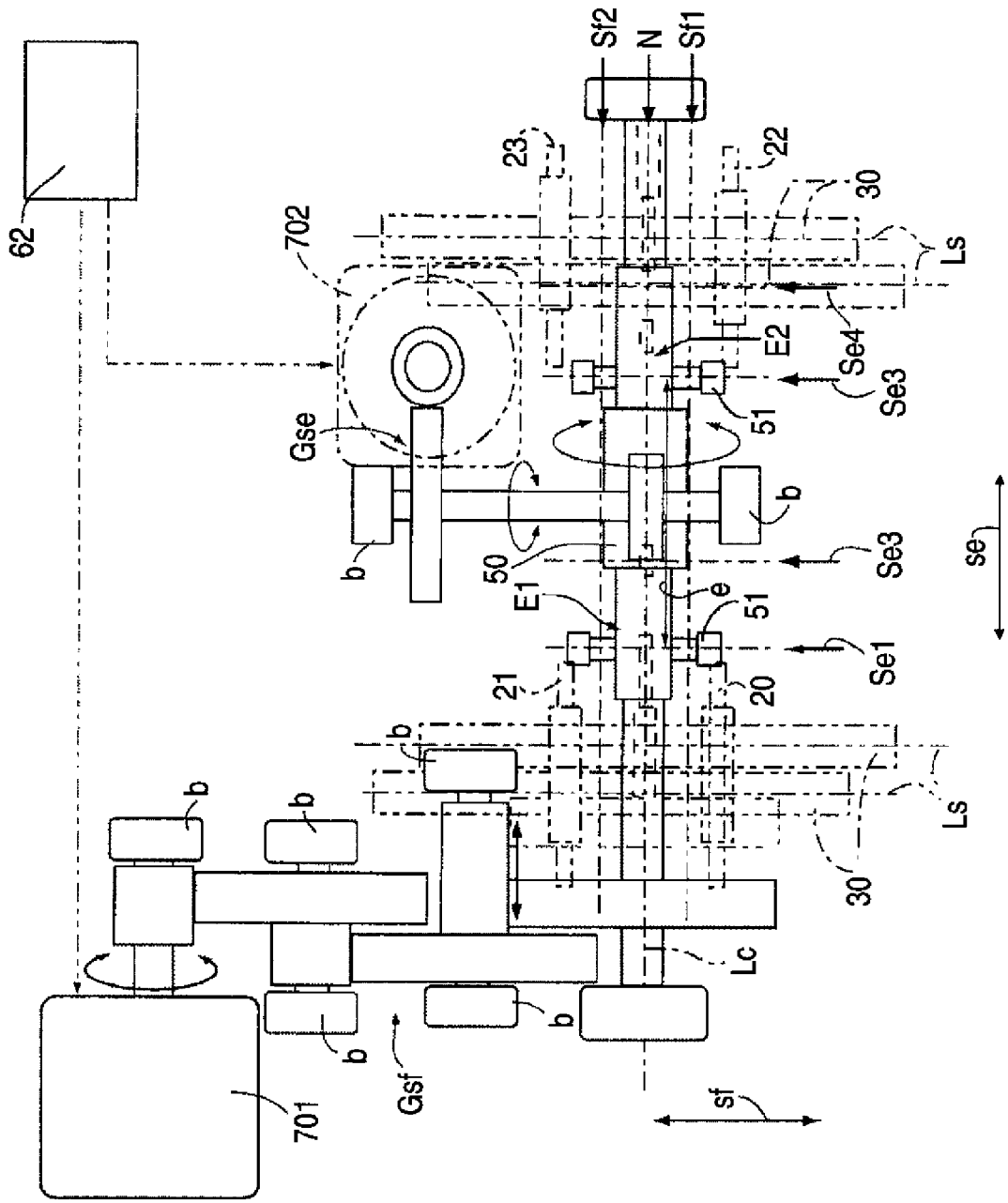
FIG. 2 is a schematic block diagram, as viewed from the top, of the gear change control system of FIG. 1.
Figure 3:
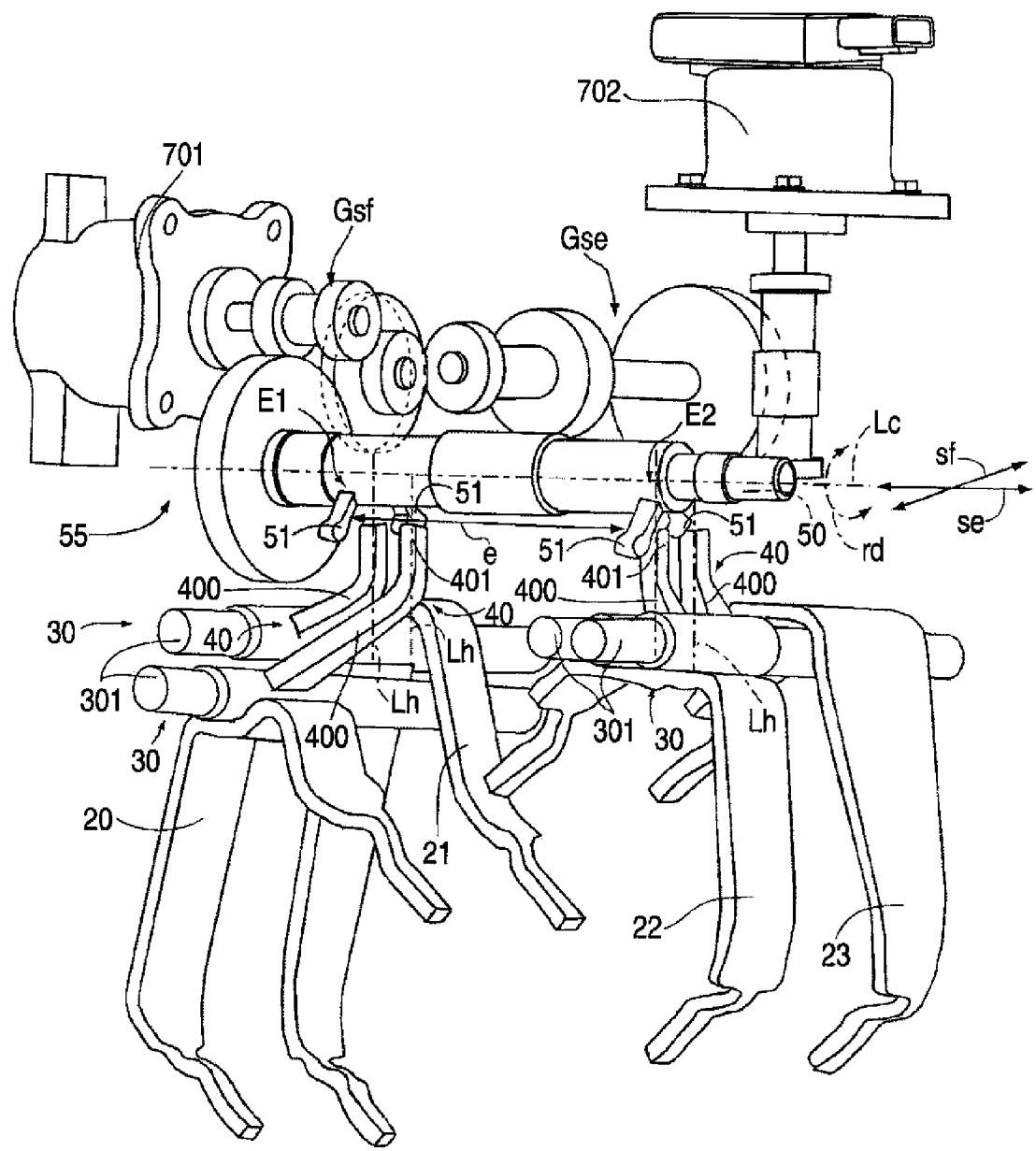
FIG. 3 is a schematic perspective view of a part of the gear change control system of FIG. 1.

As is shown in FIGS. 2 and 3, the gear change control system of the automatic transmission configured as described above includes a shift member 55 having a shaft portion 50 extended in a selecting direction se and an actuator provided at a portion thereof, pairs of arm portions (fingers) 51 which are made to project radially from a first position E1 and a second position E2 on the shaft portion 50, a plurality of shift rails (shift rail members) 30 which are disposed, as shown in FIGS. 2, 3, 5A and 5B, in such a manner that their axes are oriented in a shifting direction sf which intersects the shaft portion 50 at right angles, shift forks 20 to 23 connected, respectively, to the plurality of shift rails 30 and adapted to operate to shift gears 11, 12, 13, 14, 15, 16 and 17 disposed within the automatic transmission 1 and shift lugs 40 connected, respectively, to the plurality of shift rails 30, made to face oppositely the arm portions 51 and each having a single pillar-shaped portion 401 provided thereon in such a manner as to project therefrom.

In this gear change control system of the automatic transmission 1, the pairs of arm portions 51 are formed in the first position E1 and the second position E2 on the shift member 55 in such a manner as to project therefrom while each pair forms a bifurcate shape which defines a predetermined internal angle α0 between oppositely facing surfaces thereof. These arm portions 51 are moved for selection and shifting by the actuator, so that a gear shift to a target gear is made by any of the shift forks 20 to 23 which is linked with the shift lug 40 so selected.

Here, as is shown in FIG. 3, each shift rail (for example, a first to third gear shift rail) 30 includes a rail shaft portion 301 which is disposed in such a manner that a shift axis Ls is oriented in the shifting direction sf, a shift fork portion 21 for shifting gears within a gear section of the automatic transmission and a shift lug 40 which is made to face oppositely the arm portions 51, the shift fork portion 21 and the shift lug 40 being formed on the rail shaft portion 301 in such a manner as to project therefrom. The other shift rails have the same configuration.

Figure 6B:
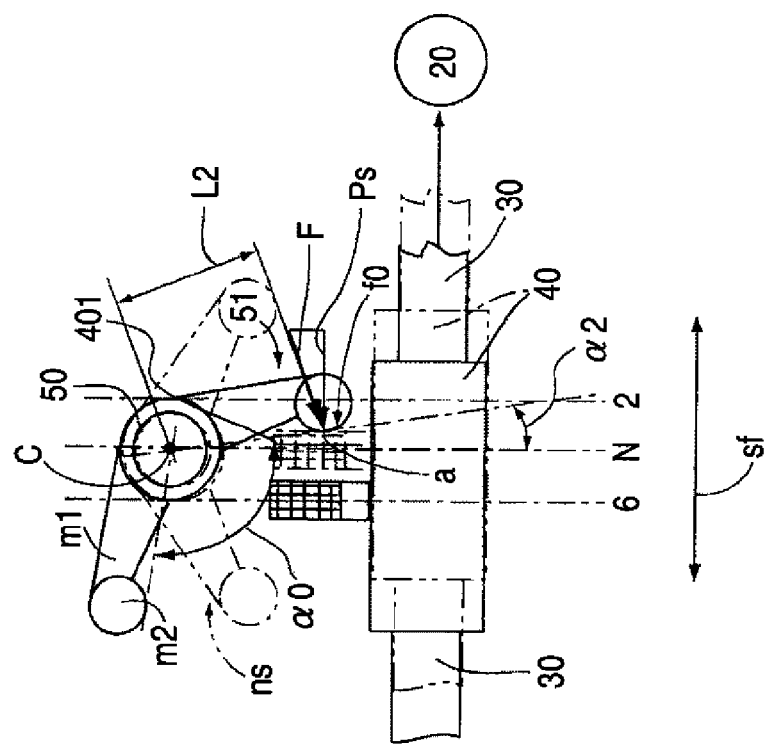
FIGS. 6A and 6B are explanatory diagrams of operations of the arm portions and the projecting portion which occur when the gear change control system in FIG. 1 makes a gear shift from a fifth gear to a sixth gear.

As is shown in FIGS. 2 and 3, the shift forks 20 to 23 are fixed, respectively, to the four shift rails 30 which are disposed movably in the shifting direction sf. Furthermore, the shift lugs 40 are provided, respectively, on the shift rails 30. As is shown in FIGS. 3 and 4, the shift lug 40 has a base portion 400 which projects obliquely upwards from the rail shaft portion 301 of the shift rail and a pillar-shaped portion 401 which projects from a distal end of the base portion, the base portion 400 and the pillar-shaped portion 401 being formed integrally. In addition, as is shown in FIG. 3, a center axis Lh in the projecting direction of the pillar-shaped portion 401 of the shift lug 40 is formed in such a manner as to project to intersect the selection axis Lc at substantially right angles as the shift rail 30 is viewed from the side. Moreover, as is shown in FIGS. 5B and 6B, the pillar-shaped portion 401 is provided in such a manner that the center axis Lh in the projecting direction thereof intersects the selection axis Lc, when the shift forks 20 to 23 of the shift rails 30 lie in a position N on a neutral line (hereinafter, referred to simply as a neutral N).

Furthermore, as is shown in FIGS. 5A and 5B, the pillar-shaped portion 401 of the shift lug 40 has a pair of side face portions f0 which are oriented oppositely to each other in the shifting direction sf. Here, when a pressure is applied from one of the side surface portions by one of the arm portions 51, which will be described later, the shift fork 20 to 23 on the shift rail 301 which is linked with the shift lug 40 is made to be activated to perform a gear shift making operation, while when a pressure is applied from the other side surface portion by the other arm portion 51, which will be described later, the linked shift fork 20 to 23 is made to be activated to operate a gear shift withdrawal operation.

The shift lug 40 configured as described above can be made only by forming integrally the base portion 400 and the pillar-shaped portion 401 thereon as a single projecting member, and the projecting amount of the shift lug 40 from the rail shaft portion 301 can be reduced to as low a level as possible, whereby the degree of freedom in lay out can be increased largely, and a cost reduction effect can be provided.

In addition, in FIGS. 5A, 5B, 6A and 6B which will be used in the description of the function of the gear change control system of the automatic transmission 1, the base portion 400 is omitted, and the pillar-shaped portion 401 is illustrated schematically as directly projecting from the shift rail 30.

Next, as is shown in FIGS. 3 and 4, the pairs of arm portions are formed, respectively, in the first position E1 and the second position E2 on the shaft portion 50 in such a manner as to project therefrom in the bifurcate fashion.

Each pair of arm portions 51, which are formed, respectively, in the first position E1 and the second position E2 on the shaft portion 50 in such a manner as to project therefrom, is made to slide together along the operation axis Lc in the selecting direction se by a selecting motor 702 (an actuator), which will be described later, so as to move for selection among the four shift rails 30 and moreover is operated to swing rd about the operation axis Lc by a shifting motor 701 (an actuator), so as to perform a shifting operation in the shifting direction sf.

Here, each pair of arm portions 51 is formed in such a manner as to project in the bifurcate fashion with the predetermined internal angle α0 formed between the oppositely facing surfaces thereof so as to move in the shifting direction sf in a withdrawal position (hereinafter, referred to as a neutral position; refer to a chain triple-dashed line ns in FIG. 5B) where the arm portions 51 do not interfere with the respective shift lugs 40 in whichever shift positions (appropriate shift positions) the shift lugs 40 may be located in such a state that the arm portions 51 are in a free state where they are not subjected to the shifting force exerted by the actuators, that is, in such a state that the shaft portion 50 is in its neutral position.

Specifically, as is shown in FIG. 4, the pair of arm portions 51 which are formed in the first position E1 (similarly configured also in the second position E2) on the shaft portion 50 in such a manner as to project therefrom in the bifurcate fashion with the internal angle α0 formed between the oppositely facing surfaces thereof each include a main portion m1 which is formed into a lever shape and a head portion m2 which is formed in such a manner as to project from a distal end of the main portion m1 towards the other oppositely facing arm portion 51. Here, since the head portion m2 is formed in such a manner as to project from a portion lying near the distal end of the main portion m1 towards the other oppositely facing arm portion 51, the head portion m2 moves round the side of the pillar-shaped portion 401 in such a state that the portion lying near the distal end of the main portion m1 oppositely faces the distal end of the pillar-shaped portion without any interference therebetween, and the head portion m2 applies a pressure Ps in the shifting direction at an appropriate angle from the side of the pillar-shaped portion 401 while avoiding interference of the main portion m1 with the pillar-shaped portion 401.

As this occurs, the head portion m2 of one of the arm portions 51 is brought into abutment with one of the surfaces (side walls) of the pillar-shaped portion 401 which are made to face oppositely each other in the shifting direction after rotation so as to apply the pressure Ps thereto to shift the shift rail 30 to one of its shift positions. In addition, the head portion m2 of the other arm portion 51 is brought into abutment with the other of the surfaces (side walls) of the pillar-shaped portion 401 which are made to face oppositely each other in the shifting direction after rotation so as to apply the pressure Ps thereto to shift the shift rail 30 to the other shift position.

Here, assuming that an internal angle is α0 which is formed by a pair of swing center axes (alternate long and short dash lines in FIGS. 5B and 6B which intersect the selection axis Lc (denoted by C in FIGS. 5B and 6B) at right angles and connect abutment positions between the respective curved head portions m2 of the pair of arm portions 51 with the selection axis Lc, by the configuration of the pair of head portions m2 which are formed in such a manner as to project towards the other oppositely facing arm portion side, the internal angle α0 can be narrowed to some extent. Because of this, when swinging, an excessive upward swing of the pair of arm portions 51 about the selection axis Lc can be suppressed, a space above the shaft portion 50 can be made relatively small, which can contribute to the miniaturization of the gear change control system.

Furthermore, as is shown in FIGS. 2 and 3, the pairs of arm portions 51 are provided on the shaft portion 50, respectively, in the first position E1 and the second position E2 in such a manner as to be spaced apart from each other at a predetermined interval e in the shifting direction. The pair of arm portions 51 in the first position E1 are made to shift the respective gears (first, second, third and sixth gears) of a first group, and the pair of arm portions 51 in the second position E2 are made to shift the respective gears (fourth, fifth and reverse gears) of a second group. By this configuration, the pair of arm portions 51 in the first position E1 face oppositely selecting positions Se1, Se3 of four selecting positions Se1 to Se4, and the pair of arm portions 51 in the second position E2 face oppositely selecting positions Se2, Se4, whereby a quick selecting operation can be implemented.

Here, since the pairs of arm portions 51 which are formed in the first and second positions (E1, E2) are spaced apart from each other at a predetermined interval e, a traveling distance equal to the predetermined interval e can be removed from their traveling distance, whereby a quicker shift operation can be implemented. Namely, since the pair of arm portions 51 in the first position E1 are made to shift the respective gears of the first group while the pair of arm portions 51 in the second position E2 are made to shift the respective gears of the second group, each pair of arm portions 51 can be made not to travel for selection over the predetermined interval e that is defined between the first and second groups, whereby a traveling distance in the selecting direction over which the shaft portion 50 has to travel for selection can be made relatively small, thereby making it possible to improve the controllability of the system activated for selection.

As is shown in FIGS. 2 and 3, the shift shaft 50 is driven to rotate about the operation axis Lc in the shifting direction by the shifting motor 701 and a reduction gear mechanism Gsf which is linked with the motor 701 and moreover is driven to slide in the operation axis Lc direction by the selecting motor 702 and a reduction gear mechanism Gse which is linked with the motor 702. These shifting motor 701 and selecting motor 702 make up a main part of the actuator, which is controlled to be driven by an ECU 62 based on the operation of a gear shift lever, not shown, and the running conditions of the engine 8. For example, these motors are switched on and off sequentially when making a gear change from the currently engaged gear to a target gear.

The ECU 62 controls the operation of the clutches 2, 3 when making a gear change. Specifically, when changing gears, the ECU 62 switches a state in which one of the clutches 2 or 3 is engaged with the current gear to a state in which the other clutch 3 or 2 is gradually engaged with the next gear while gradually disengaging the one of the clutches 2 or 3, whereby a gear change is realized which is free from interruption of power flow.

Next, referring to FIGS. 5A and 5B, a case will be described in which an upshift is made from the currently engaged first gear (lying on the first clutch 2 side) to the second gear (lying on the second clutch 3 side).

In this case, as is indicated by solid lines in FIG. 5A, the gear change to the currently engaged first gear has already been completed, and the actuator returns both the pairs of arm portions 51 in the first and second positions (E1, E2) to the neutral N together with the shaft portion 50 and furthermore holds them in the withdrawal position (refer to the chain triple-dashed line ns in FIG. 5B) which is a neutral position where the interference of the pairs of arm portions 51 with the respective pillar-shaped portions 401 can be avoided.

Then, the actuator activates the pair of arm portions 51 in the first position E1 for selection and causes the pair of arm portions 51 to move on to a sixth to second gear shift line, on which the pair of arm portions 51 in the first position are caused to swing so as to shift the pillar-shaped portion 401 of the shift lug 40 in the neutral N into the second gear.

Thereafter, when the gear shift to the second gear is completed, the first clutch 2 is disengaged while the second clutch 3 is engaged, whereby a gear change with no interruption of power flow can be implemented. Furthermore, in this embodiment, since the dual clutch is adopted, in anticipation of the next gear change operation or a so-called upshift operation to the third gear, the actuator returns the pairs of arm portions 51 in the first and second positions (E1, E2) to the neutral position together (the withdrawal position: refer to the chain triple-dashed line ns in FIG. 5B) with the shaft portion 50 so as to avoid the interference of the pairs of arm portions 51 with the respective pillar-shaped portions 401 (refer to a chain double-dashed line in FIG. 5B). Thereafter, the actuator returns the pair of arm portions 51 in the first position on to a first to third gear shift line, where the pair of arm portions 51 are caused to swing so as to return the pillar-shaped portion 401 of the oppositely facing first to third gear shift line from the first gear to the neutral N, while continuing the shifting operation to make a gear shift to the third gear for preparation for an upshift operation to the third gear.

Alternatively, when the first gear needs to be returned to the neutral N, the pair of arm portions 51 in the first position E1 are activated to move for selection to return to the first to third gear shift line, where the pair of arm portions 51 are caused to swing so as to perform a withdrawal operation of the pillar-shaped portion 401 of the oppositely facing first to third gear shift rail 30 from the first gear to the neutral N (refer to a chain double-dashed line in FIG. 5B).

In this way, in the shift lug 40 on the first to third gear shift line, on the first to third gear shift line, the pair of arm portions 51 in the first position E1 apply a pressure F to one f0 of the surfaces of the pillar-shaped portion 401 of the shift lug 40 so as to make a gear shift to the first gear. Thereafter, having returned to the neutral position (the withdrawal position: refer to the chain triple-dashed line ns in FIG. 5B), the pair of arm portions 51 in the first position E1 are caused to move for selection on to a sixth to second gear shift line, so as to make a gear shift to the second gear. Thereafter, the pair of arm portions 51 are caused to return to the first to third gear shift line, where one of the pair of arm portions 51 (a position denoted by reference character n1 in FIG. 5B) is brought into abutment with the other f0 of the side surfaces of the shift lug 40 so as to apply a pressure F, whereby a gear shift withdrawal operation from the first gear is implemented. As this occurs, as is shown in FIG. 5B, the "gear shift making operation (gear engaging)" and the "gear shift withdrawal operation (gear disengaging)" can be implemented by the pillar-shaped projecting portion 401 of the single shift lug 40, and the projecting amount of the shift lug 40 can be reduced to as low a level as possible. In addition, the degree of freedom in layout is increased, and a cost reduction effect can be provided.

Furthermore, in a gear shift withdrawal operation that will occur after the pair of arm portions 51 in the first position E1 have made a gear shift to a target gear (the second gear), the actuator returns the pair of arm portions 51 in the first position E1 to the neutral position (the withdrawal position: refer to the chain triple-dashed line ns in FIG. 5B) so as to cause the previous gear (the first gear) to return to the neutral N. Thus, the gear shift withdrawal operation can easily be completed in the way described above, whereby the number of steps involved in the gear shift withdrawal operation can be reduced, and hence, the gear change time can be shortened.

Furthermore, the following advantage will be provided when the pair of arm portions 51 in the first position E1 are caused to swing to shift the pillar-shaped portion 401 of the shift lug 40 into the second gear after having been caused to move for selection on to the sixth to second gear shift line (refer to FIG. 5A), or when the pair of arm portions 51 make an upshift operation to the third gear after having been caused to make a gear shift withdrawal operation on the first to third gear shift line (refer to a position denoted by reference character n2 in FIG. 5B).

Namely, it assumes that the force applied to the oppositely facing surface f0 of the pillar-shaped portion 401 by one of the pair of arm portions 51 in the position denoted by reference character n2 in FIG. 5B is a tangential force F, a distance from a contact point a between one of the pair of arm portions 51 and the pillar-shaped portion 401 to an axial center C of the control shaft 100 is a distance L2, an inclination angle of a line which connects the contact point a with the axial center C in the shifting direction is a2. Here, a component force P1 (referred to as Ps in FIGS. 5A and 5B) of the tangential force F in the shifting direction is obtained by the expression (1) mentioned above. It is clear from the expression (1) that as the angle α becomes smaller, the component force P1 (referred to as Ps in FIGS. 5A and 5B) approaches the tangential force F, that is, the component force P1 increases, and this ensures that the gear shift making operation is performed properly, thereby making it possible to reduce the gear change time.

In addition, when the "gear shift withdrawal operation (gear disengaging)" is performed as is indicated by a chain double-dashed line (denoted by reference character ns) in FIG. 5B, although the pressure by the other of the pair of arm portions 51 is dispersed compared with the gear shift making force due to the inclination angle α2 becoming larger, a force as large in magnitude as one required when the "gear shift making operation (gear engaging)" is performed is not necessary, and hence, a smooth gear shift withdrawal operation can be maintained.

Furthermore, as is shown in FIG. 1, when the invention is applied as the gear change control system of the automatic transmission 1 in which the rotational force is selectively transmitted through the gears to the oppositely facing countershafts 6, 7 of the automatic transmission via the first and second main shafts 4, 5 of the dual clutch, since the gear change process can be shortened to increase the gear change speed, the gear change control system can increase the gear change controllability in cooperation with the dual clutch.

Next, referring to FIGS. 6A and 6B, a case will be described in which an upshift operation is made from the currently engaged gear, which is the fifth gear in this case, to the sixth gear.

Figure 6A:
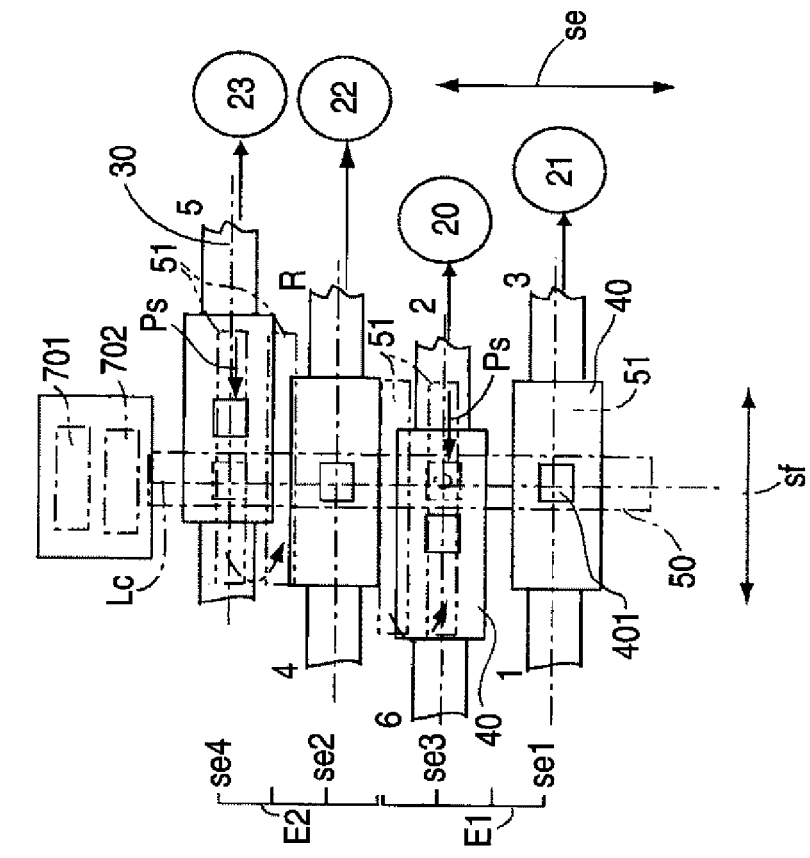
Figure 7:
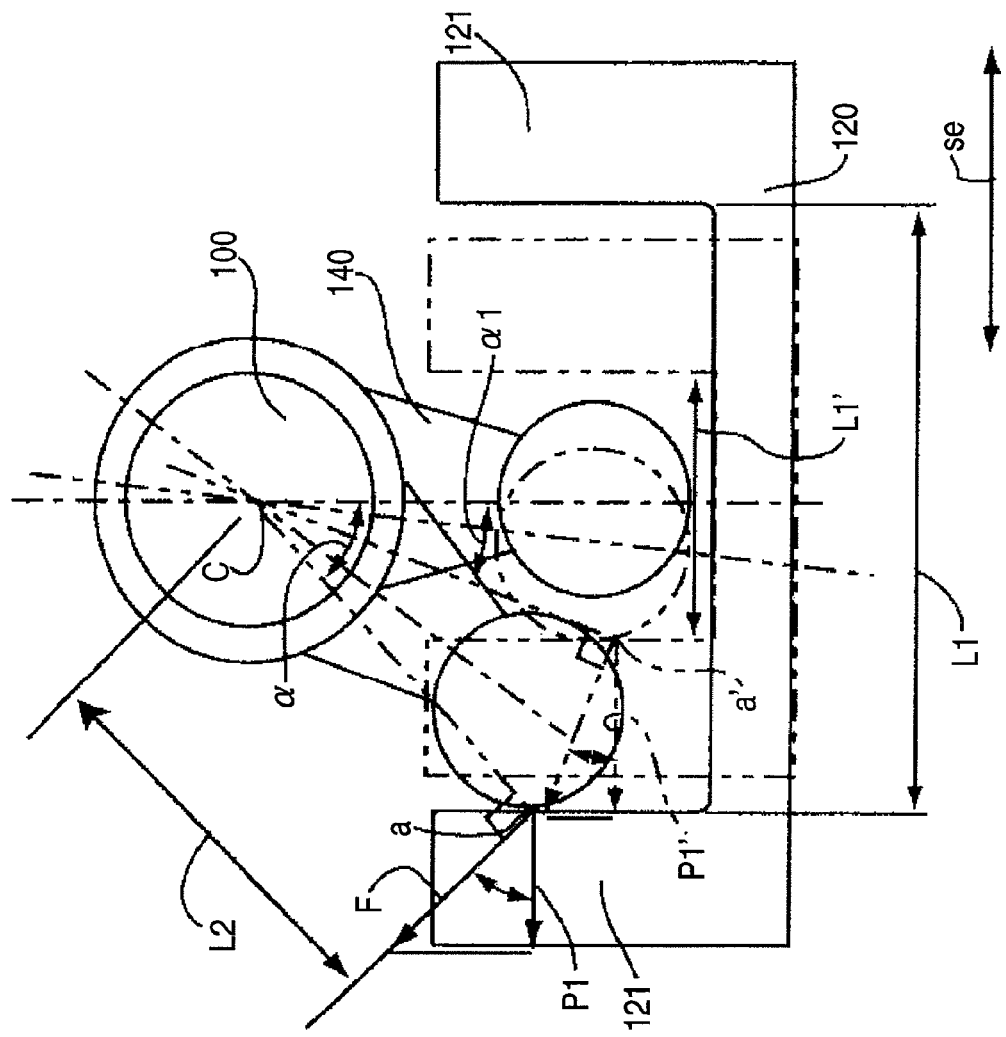
FIG. 7 is an explanatory diagram of operations of an arm portion and a projecting portion which are performed when a gear shift is made by a related-art gear change control system.
Figure 8A:
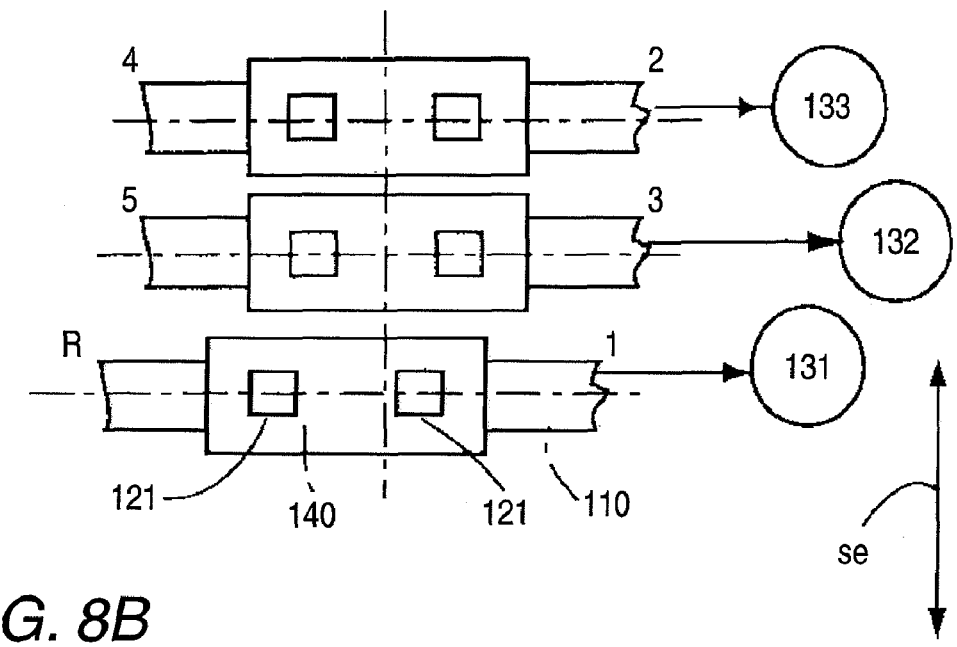
FIGS. 8A and 8B are diagrams showing the arm portion and the projecting portion of a related-art gear change control system.
Figure 8B:
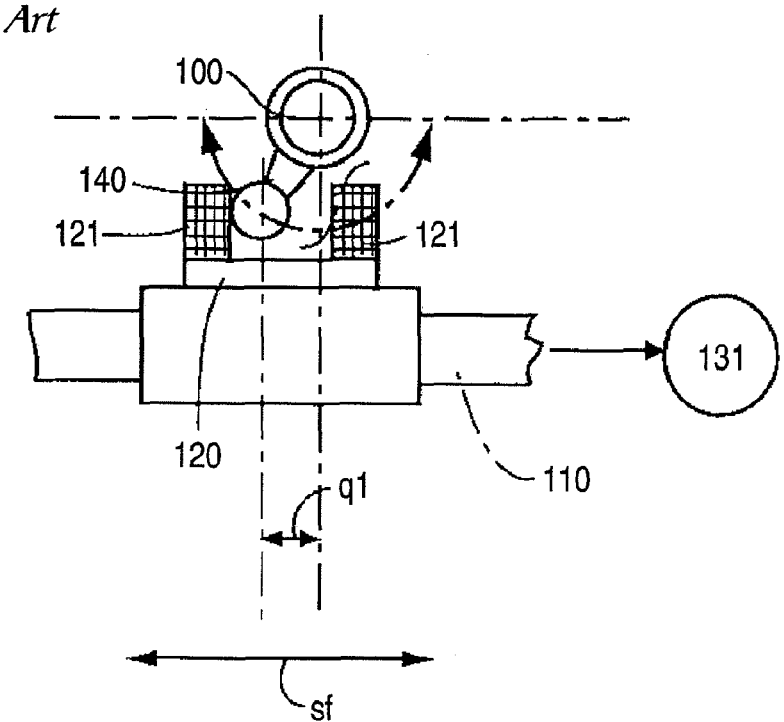
Figure 9A:
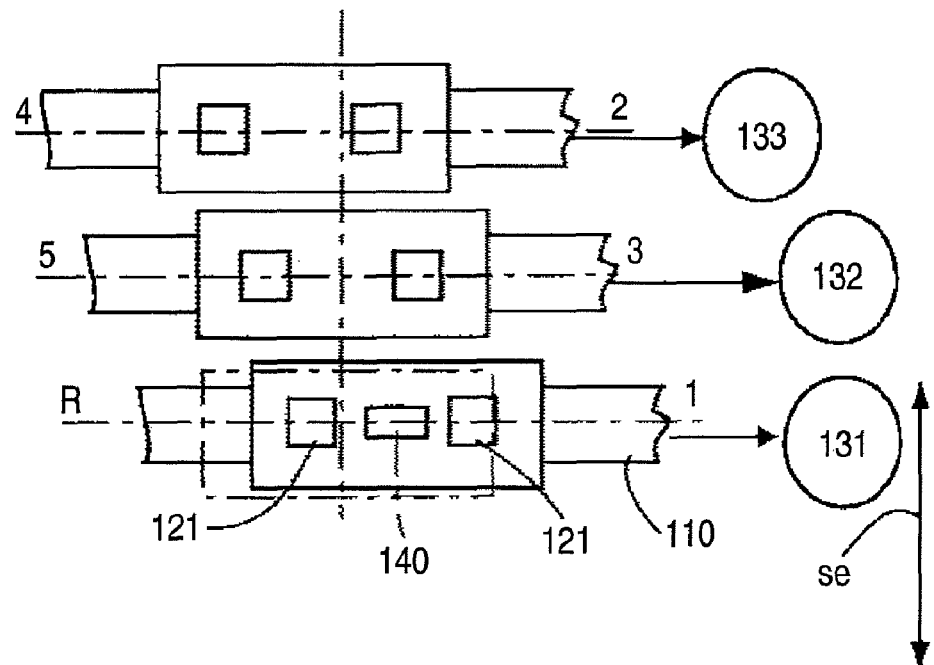
FIGS. 9A and 9B are diagrams showing the arm portion and the projecting portion when a gear shift is made from a fourth gear to a first gear by a related-art gear change control system.
Figure 9B:
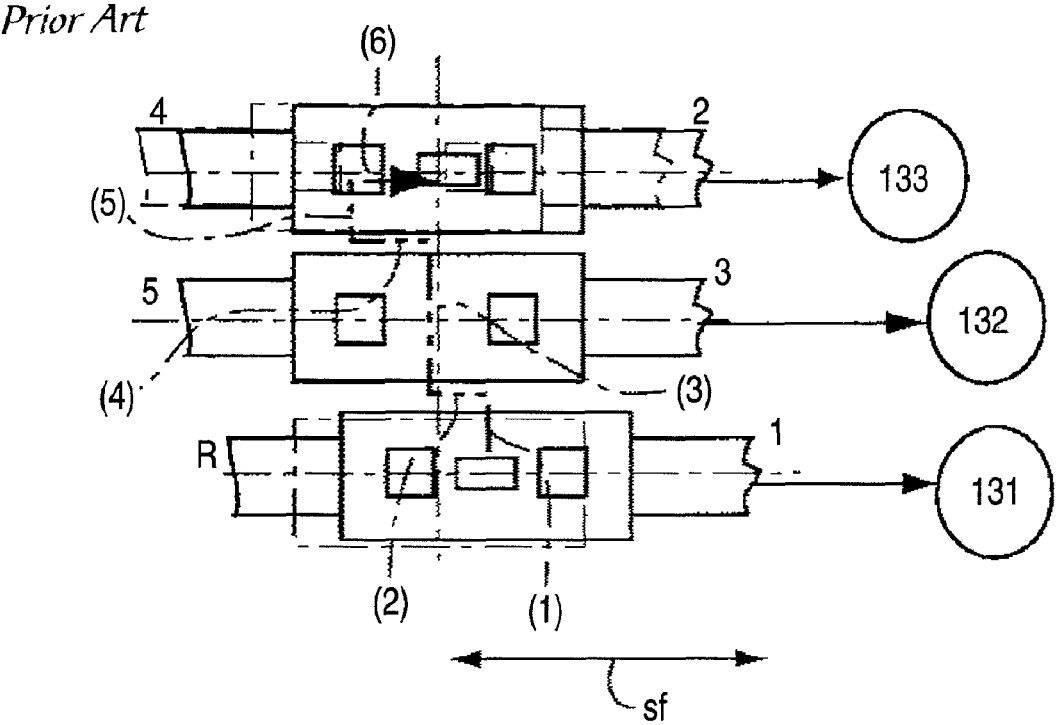

In this case, the currently engaged gear is the fifth gear (refer to solid lines in FIG. 6A). The actuator causes the pair of arm portions 51 in the second position E2 to rotate to a neutral position of the fifth gear shift line (the withdrawal position: refer to a chain double-dashed line ns in FIG. 6B) (the pair of arm portions 51 in the first position E1 are also caused to swing simultaneously). Following this, the actuator causes the pair of arm portions 51 in the first position E1 to move for selection to the sixth to second gear shift line (the pair of arm portions 51 in the second position E2 are also caused to do the same in an interlocked fashion), so as to shift the shift lug 40 on the sixth gear (the target gear) side into the sixth gear from the neutral N (refer to a solid line in FIG. 6B).

In the gear shift withdrawal operation, the pair of arm portions 51 in the first position E1 are caused to return to the neutral position of the sixth to second gear shift line (the withdrawal position: refer to the chain double-dashed line ns in FIG. 6B) and the pair of arm portions 51 in the second position E2 are caused to move for selection to the neutral position (the withdrawal position) of the fifth gear shift line. Thereafter, the arm portions 51 are caused to swing to perform a gear shift withdrawal operation of withdrawing the pillar-shaped portion 401 of the oppositely facing fifth gear shift rail 30 from the fifth gear position to the neutral N. In addition, when the gear shift from the fifth gear is completed, the first clutch 2 is disengaged and the second clutch 3 is engaged so as to make a gear change with no interruption of power flow.

As this occurs, in the gear shift withdrawal operation, both the pairs of arm portions 51 in the first and second positions (E1, E2) are caused to return to the neutral positions (the withdrawal position: refer to the chain double-dashed line ns in FIG. 6B), and thereafter, one of the pair of arm portions 51 in the second position E2 is caused to swing the pillar-shaped portion 401 of the fifth gear shift rail 30 so as to cause it to return to the neutral N. Thus, this series of operations only have to be carried out to implement the gear shift withdrawal operation, and when compared with the conventional gear change control system, the gear shift withdrawal operation can be implemented in a smoother fashion, thereby making it possible to reduce the gear change time.

Moreover, as is shown in FIG. 6B, since the angle α2 of the swing center axis (indicated by an alternate long and short dash line) of the arm portion 51 which comes into abutment with the center axis of the pillar-shaped projecting portion 401 at a point c (the position of the selection axis) is relatively small, the component force (referred to as Ps in FIGS. 6A and 6B) in the shifting direction of the tangential force F which is applied to the side surfaces f0 of the projecting portion 401 which face oppositely in the shifting direction sf by the arm portion 51 can be held relatively large, whereby the shifting operation is ensured and the gear change time can be reduced.

The automatic transmission 1 described heretofore is the dual-clutch automatic transmission which includes the two clutches 2, 3 and the two main shafts 4, 5 and is configured in such a manner that the rotational force is selectively changed in speed to be transmitted to the oppositely facing countershafts 6, 7 of the automatic transmission through the gears 11 to 17 via the first and second main shafts 4, 5. Since the invention is applied as the gear change control system of the automatic transmission 1 that is configured as has been described above, in particular, the function to shorten the gear change process so as to increase the gear change speed can cooperate with the function of the dual clutch so as to increase the gear change controllability.

Further, in addition to the dual-clutch automatic transmission 1 which includes the two clutches 2, 3, the two main shafts 4, 5 and the two countershafts 6, 7, the invention can also be applied to a dual clutch automatic transmission which includes a single countershaft.

In addition, the invention can also be applied to a normal single-clutch automatic transmission, in which case the same function and advantage as those provided in this embodiment can also be provided.

According to an aspect of the invention, the pair of arm portions can freely move in the selection axis direction for selection without interfering with the shift lug members after they swing about the selection axis to reach the neutral position, and by the shape of the arm portion which is suitable for application of a pressure from one side or the other side of the pillar-shaped portion of the selected shift lug member, the pressure is so applied to the shift lug member so as to cause the shift fork portion which is linked with the shift lug member to perform a gear engaging or gear shift making operation or a gear disengaging or gear shift withdrawing operation. Because of this the change speed process of the arm portions can be shortened, thereby making it possible to increase the gear change controllability.

In addition, since the operation in which one of the pair of arm portions comes into abutment with one of the side portions of the selected shift lug member so as to apply the pressure thereto and the operation in which the other of the pair of arm portions comes into abutment with the other side portion so as to apply the pressure thereto can be performed as required, the "gear shift making operation (gear engaging)" and "gear shift withdrawal operation (gear disengaging)" can be implemented by the single pillar-shaped shift lug, and the projecting amount of the shift lug member can be reduced to as low a level as possible, whereby the degree of freedom in layout can be increased, and a cost reduction effect can be provided.

According to an aspect of the invention, since the sides of the pillar-shaped portion of the shift lug member with which the arm member is brought into abutment are made to have a planar shape, the pressure exerted from the arm member can be received by the surfaces in an ensured fashion, thereby making it possible to ensure the implementation of the "gear shift making operation (gear engaging)" and "gear shift withdrawal operation (gear disengaging)."

According to an aspect of the invention, since the pillar-shaped portion of the shift lug member projects from the shift rail member substantially perpendicularly as the shift rail member is viewed from the side and is provided in such a manner that the center axis in the projecting direction of the pillar-shaped portion intersects the selection axis when the shift fork portion of the shift rail member is in the neutral state, when performing the shift making operation (gear engaging), the angle at which one of the pair of arm portions is brought into abutment with the shift lug member becomes suitable (the angle between the finger abutment direction and the side surface of the shift lug member becomes close to 90 degrees), whereby the pressure exerted by the finger is transmitted in the form of a gear shift making force with good efficiency. On the other hand, when performing the gear shift withdrawal operation (gear disengaging), although the pressure by the other of the pair of arm portions is dispersed, since a force which is as large as the force required when performing the gear shift making operation (gear engaging) is not necessary when performing the gear shift withdrawal operation (gear disengaging), a smooth gear shift withdrawing operation can be maintained.

According to an aspect of the invention, the pair of arm portions which bifurcate to hold the predetermined internal angle between their oppositely facing surfaces can easily move in the selecting direction without interfering with the respective shift lug members which are in their appropriate shift positions, whereby a quick selecting movement can be implemented.

According to an aspect of the invention, the head portion moves round the side of the pillar-shaped portion without the distal end portion of the main part of each arm portion interfering with the distal end of the pillar-shaped portion of the shift lug member, and the head portion is allowed to apply the pressure in the shifting direction from the side of the pillar-shaped portion. Thus, when performing a gear shift making operation (gear engaging), the head portion of the arm portion is brought into abutment with the shift lug member at a more appropriate angle (the angle between the finger abutment direction and the side surface of the shift lug member becomes close to 90 degrees), whereby the pressure by the finger is transmitted in the form of gear shift making force with good efficiency, the gear shift control being thereby implemented easily and stably.

According to an aspect of the invention, the invention can be applied to a gear change control system for an automatic transmission in which a rotational force is selectively changed in speed to be transmitted through gears to countershafts of the transmission which are made to face oppositely each other via first and second main shafts of a dual clutch, and as this occurs, in particular, since the gear change process can be shortened to increase the gear change speed, the gear change control system can increase the gear change controllability in cooperation with the dual clutch.

According to an aspect of the invention, by the arm members in the first position being made to shift the respective gears of the first group and the arm members in the second position being made to shift the respective gears of the second group, the respective arm portions can be made not to move over the predetermined interval between the first and second groups, whereby the traveling amount in the selecting direction of the shaft portion for selection can be made relatively small, thereby making it possible to improve the controllability of the system operated for selection.

The invention thus described, it will be obvious that the same say be varied in many ways. Such variations are not to be regarded as a departure from the sprit and scope of the invention, and all such modifications as would be obvious to one skilled in the art are intended to be included within the scope of the following claims.

What is claimed is:

1. A gear change control system of an automatic transmission, comprising:
    a shift member, including a shaft portion disposed in such a manner that a selection axis thereof is oriented in a selecting direction, and including an arm portion formed on the shaft portion in such a manner as to project therefrom; and
    a plurality of shift rail members, having rail shaft portions, and arranged in such a manner that shift axes of the rail shaft portions are oriented in a shifting direction, shift fork portions formed on the rail shaft portions in such a manner to project therefrom and operable to make gear shifts of gears within a change-speed gear section, shift lug members being formed on the rail shaft portions in such a manner to project therefrom and being capable of facing the arm portion, wherein the arm portion of the shift member moves for selection and gear shifting and presses against a selected shift lug member, so that a gear shift to a target gear is attained by the shift fork portion linked with the shift lug member so pressed against via the rail shaft portion,
    wherein, the shift lug members include pillar-shaped portions projecting substantially vertically from the shift rail members in a side view of the shift rail members, when the shift fork portions of respective shift rail members are in a neutral state, center axes of all of the respective pillar-shaped portions and the selection axis are arranged as to intersect with each other,
    the arm portion includes a pair of arm portions projecting from the shaft portion in a bifurcated fashion with an opposed angle therebetween, the opposed angle is set in such a manner that the pair of arm portions moves for selection without interfering with the respective shift lug members disposed at appropriate shift positions, and the pair of the arm portions move for selection in a direction of the selection axis to select the shift lug member and then swing about the selection axis to apply a pressure in the shifting direction from one side of the pillar-shaped portion of the selected shift lug member by one of the pair of the arm portions to cause the shift fork portion of the shift rail member linked with the shift lug member to perform a shift making operation, and to apply a pressure in the shifting direction from the other side of the selected pillar-shaped portion by the other arm portion to cause the shift fork portion of the shift rail member linked with the shift lug member to perform a shift withdrawing operation.

2. The gear change control system of the automatic transmission as set forth in claim 1, wherein
    the pillar-shaped portion of the shift lug member has a pair of side surface portions oriented oppositely to each other in the shifting direction,
    when a pressure is applied by one of the pair of the arm portions from one of the side surface portions of the pillar-shaped portion of the shift lug member, the shift fork portion of the shift rail member linked with the shift lug member is made to perform a shift making operation, and
    when a pressure is applied by the other arm portion from the other side surface portion, the shift fork portion is made to perform a shift withdrawing operation.

3. The gear change control system of the automatic transmission as set forth in claim 1, wherein
    a head portion is formed on each of the pair of the arm portions in such a manner as to project from a distal end of a main part thereof towards the other arm portion.

4. The gear change control system of the automatic transmission as set forth in any one of claim 1, wherein
    the automatic transmission comprises a plurality of gears divided into first and second groups, and first and second main shafts associated with the first and second groups, respectively, the first and second main shafts being coupled to an engine driving force transmission shaft via a dual clutch.

5. The gear change control system of the automatic transmission as set forth in any one of claim 1, wherein
    the pair of arm portions are respectively formed to be projected in first and second positions on the shaft portion, the first and second positions being spaced apart from each other with an interval therebetween in the selecting direction.

* * * * *